United States Patent [19]
Granich et al.

[11] Patent Number: 5,557,803
[45] Date of Patent: Sep. 24, 1996

[54] SHOCK ABSORBENT PROTECTIVE GLOVE

[76] Inventors: Timothy E. Granich; Marilyn Granich, both of 4871 Sevilla Way, Carlsbad, Calif. 92008

[21] Appl. No.: 461,758

[22] Filed: Jun. 5, 1995

Related U.S. Application Data

[63] Continuation of Ser. No. 279,090, Jul. 22, 1994, abandoned, which is a continuation of Ser. No. 981,604, Nov. 25, 1992, abandoned.

[51] Int. Cl.⁶ .................................................. A41D 13/10
[52] U.S. Cl. ............................ 2/16; 2/20; 2/19; 2/161.1
[58] Field of Search ..................... 2/16, 161 A, 161.1, 2/161.4, 162, 159, 19

[56] References Cited

U.S. PATENT DOCUMENTS

| | | | |
|---|---|---|---|
| 3,649,967 | 3/1972 | Millman | 2/161 A |
| 4,042,975 | 8/1977 | Elliott, Jr. et al. | 2/161 A X |
| 4,484,359 | 11/1984 | Tirinen | 2/169 X |
| 4,541,127 | 9/1985 | Gould | 2/19 |
| 4,748,690 | 6/1988 | Webster | 2/161 A X |
| 4,757,555 | 7/1988 | Gold | 2/161 A X |
| 4,768,234 | 9/1988 | Yamamoto | 2/16 X |
| 4,891,845 | 1/1990 | Hayes | 2/161 A X |
| 5,150,475 | 9/1992 | Hansen et al. | 2/16 |

*Primary Examiner*—Paul C. Lewis
*Attorney, Agent, or Firm*—Baker, Maxham, Jester & Meador

[57] ABSTRACT

A shock absorbent protective GLOVE (24) to be used as an underglove in conjunction with a baseball/softball mitt, which extends above the wrist and up the lower forearm. The hand section (22) of the GLOVE (24) contains thin quasi-liquid, shock absorbent, flexible material with shape memory properties covering the fingers, the base of the fingers and the palm or the metacarpal bones of the hand. The wrist section (18) of the GLOVE (24) contains shock absorbent material of closed cell and shape memory properties covering the carpal bones and thus the ulna nerve where it enters the hand at the wrist. The forearm section (12,14) of the GLOVE (24) contains at least one layer of shock absorbent material patterned to optimize flexibility and protection of the lower ulna and radius bones as well as the front surface of the lower forearm.

3 Claims, 3 Drawing Sheets

SHOCK ABSORBENT PROTECTIVE GLOVE

This is a continuation of application Ser. No. 08/279,090, filed Jul. 22, 1994, now abandoned, which is a continuation of application Ser. No. 07/981,604, filed Nov. 25, 1992, now abandoned.

BACKGROUND-FIELD OF INVENTION

This invention relates to protective devices, specifically to protective gloves encompassing the wrist and the hand.

BACKGROUND OF THE INVENTION

Baseball players ("infielders") particularly first baseman and catchers, routinely take hard blows on their hand, wrist and forearm of their fielding arms. Specifically the following; hereafter to be referred to as the, "MEDICALLY SENSITIVE AREAS," the fingers, base of the fingers and the metacarpal bones of the hand; the ulna nerve where it enters the hand at the carpal bones of the wrist; the lower ulna and radius bones and front surface of the lower forearm. Typically, the baseball takes an unexpected hop and strikes the player's hand wrist and lower forearm in an awkward fashion. Either scenario results in a severe, painful bruise or welt on the fore mentioned,"MEDICALLY SENSITIVE AREAS." A bruise or other damage of the ulna or radius bones of the forearm, the carpal bones and ulna nerve at the wrist or the metacarpal bones or fingers of the hand could even occur. A temporary or permanent episode of numbness in the hand, wrist and forearm leading to possible, spontaneous recurrence could occur if the ulna nerve is struck. Also a circulatory condition known as, "WHITE FINGER," which occurs as a result of continuous shock sustained by the same sensitive area of the hand, be it the finger or otherwise, from such activity as pounding nails with a hammer or catching a baseball/softball, could arise and cause a temporary or permanent loss of sensation or feeling in the hand or fingers.

Various attempts have been made to protect these areas, yet these have met with limited success. These attempts also were only able to protect one specific area. For example, in U.S. Pat. No. 4,541,127 Gould Sep. 17, 1985 illustrates a device which must be attached to the heel of the fielding mitt in order to attempt to protect the wrist. It also fails to provide any protection to the hand. Furthermore, since this product is constructed partially of a ridged material, it makes the product ridged, thus, limiting flexibility. Also, it severely limits the user's range of movement since it contains only one flexible break or seam.

U.S. Pat. No. 3,994,024 Bates is a padded protector flap which laces to the heel of a catcher's mitt. The flap is a nuisance to the catcher because the laced connection between the flap and mitt allows the flap to swing freely. Thus, the flap is free to flop away from the catcher's wrist. Thus it may move to a position where the wrist is totally unprotected. It may even move to a position where the glove pocket is obstructed for fielding the baseball. Since the flap consists of a thin, single padded layer covered by leather, it provides only limited protection for the catcher's wrist. Here again the product has neglected to protect the hand.

U.S. Pat. No. 4,937,882 Hayes, Jul. 3, 1990, is a device designed to guard against internal hyperextension of ligaments and tendons. It is not designed to absorb the shock subjected to the wrist when, for instance, it is stricken by a baseball. Once again this product fails to protect the hand.

U.S. Pat. No. 4,958,384 McCrane, Sep. 25, 1990, is a safety glove designed to guard against internal hyperextension of ligaments and tendons in the wrist. Yet, the product fails to protect the wrist and or hand from the shock they can be subject to when stricken by an object.

U.S. Pat. No. 4,438,532 Campanella et. al. Mar. 27, 1984, is a protective glove which was designed to protect the interphalangeal joint. This product fails to implement any shock-absorbent material. Thus the hand, wrist and lower forearm remain susceptible to shock.

Accordingly, there indeed exists a need for a protective device which takes into account both the sensitivity of the hand and the vulnerability of the wrist. Such a device which would contain shock-absorbent material to protect the palm and fingers of the hand and the medically sensitive area of the wrist and lower forearm.

It is thus one object of my GLOVE to provide a protection device that is flexible and lightweight. Yet it will provide substantial shock-absorbent protection for both the hand and the wrist.

Another object of my GLOVE is to provide a protection device of varying layers of shock-absorbent material. These, layers to be placed in a configuration to optimize protection as well as flexibility.

Another object of my GLOVE to provide a shock-absorbent surface that is patterned so that spaces are left between sections of shock absorbent material. This is done in order to allow for the greater displacement of shock, by allowing for room for the shock absorbent material to expand.

Yet another object of my GLOVE to provide a device which is easily put on and taken off as simply as a normal glove.

Another object of my GLOVE to provide the user a protective glove which is form fitting to the hand, wrist and lower forearm. This, is in order to offer maximum protection as well as flexibility.

SUMMARY OF THE INVENTION

In accordance with the foregoing objects, my GLOVE is a protection device having shock-absorbent properties for protecting the fore mentioned "MEDICALLY SENSITIVE AREAS" of the hand, wrist and lower forearm.

DRAWING FIGURES

DESCRIPTION FIGS. 1-4

Figure 2:
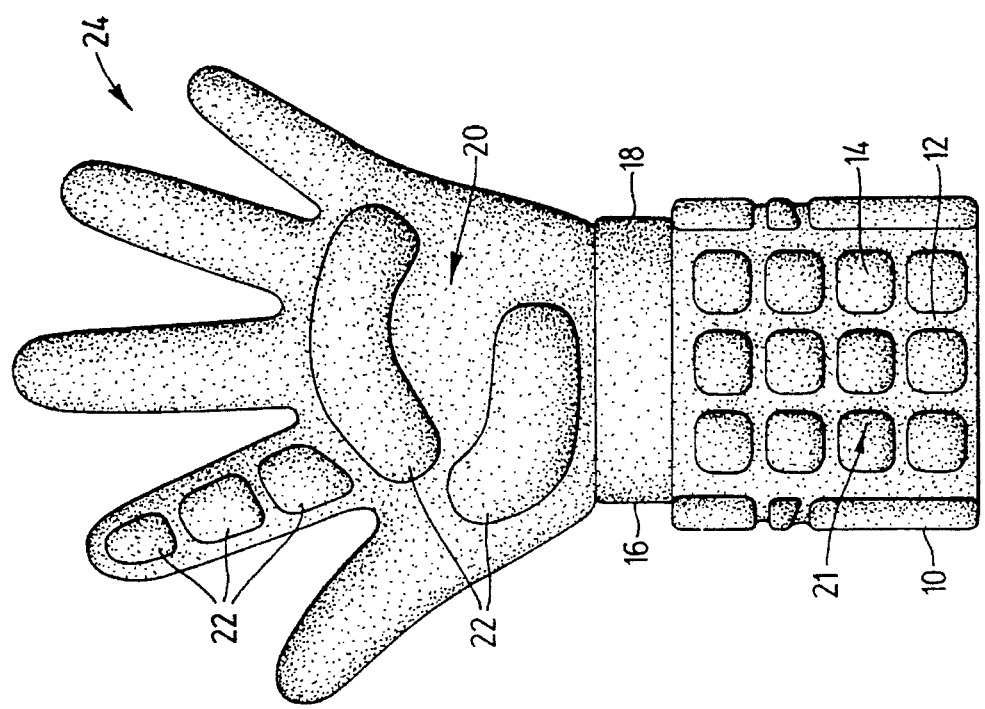
FIG. 2 Is a bottom plan view of the GLOVE of FIG. 1
Figure 1:
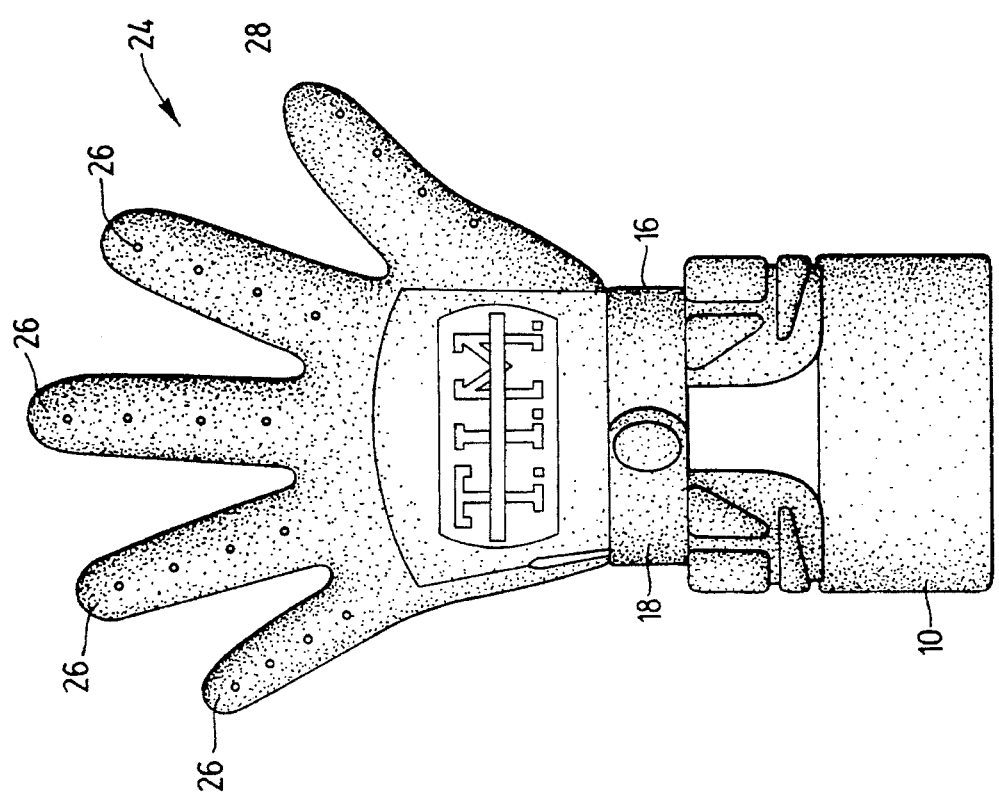
FIG. 1 Is a top plan view of the GLOVE.
Figure 3:
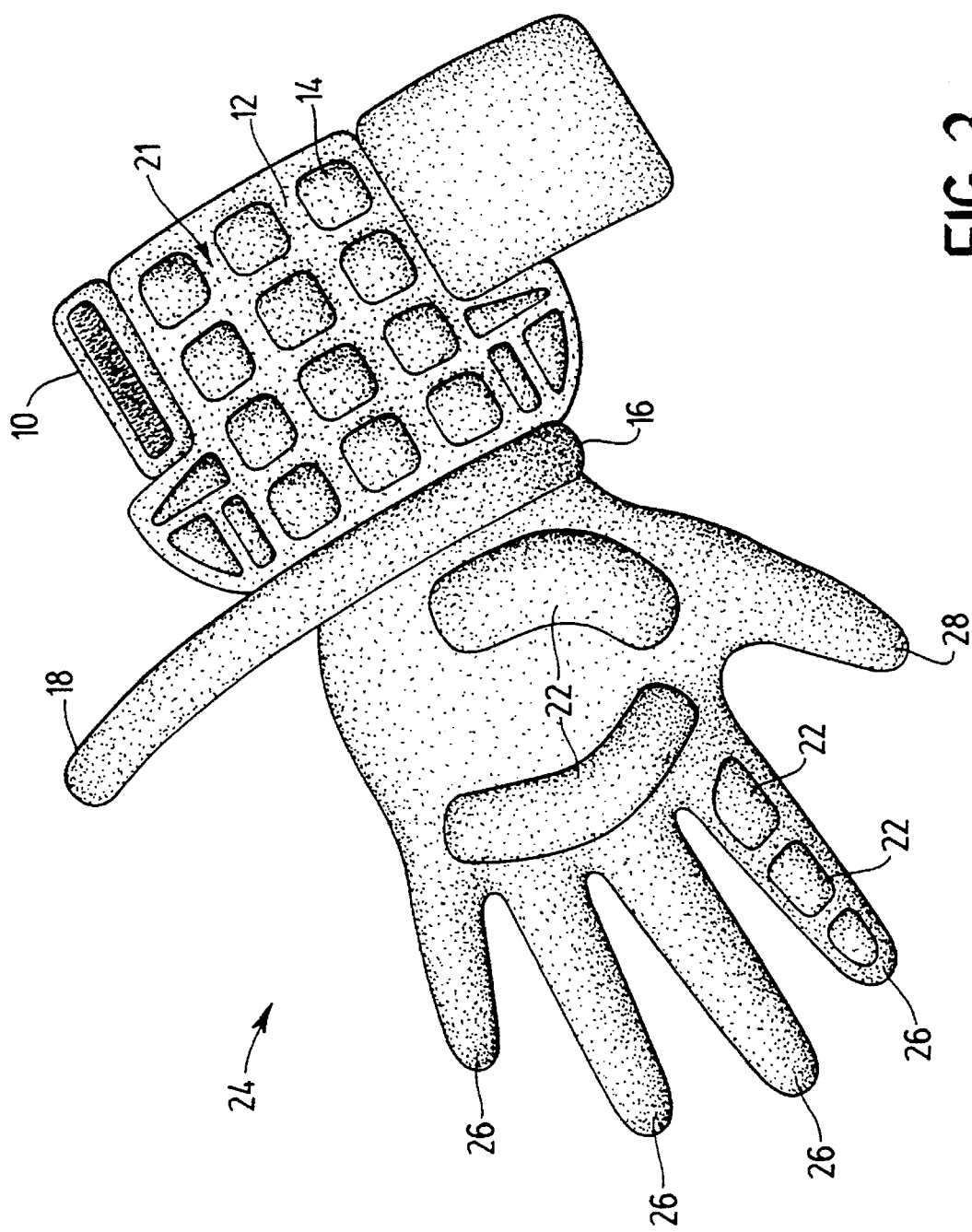
FIG. 3 Is a perspective view of the GLOVE of FIG. 1
Figure 4:
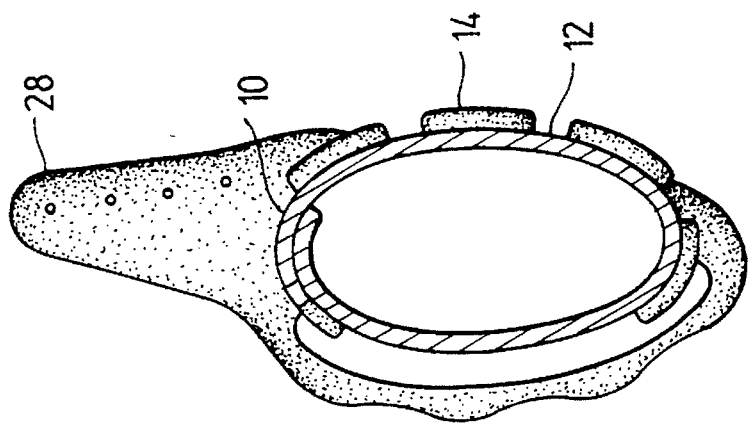
FIG. 4 Is a cross-sectional view of the GLOVE of FIG. 1 along the wrist portion.
Figure 5:
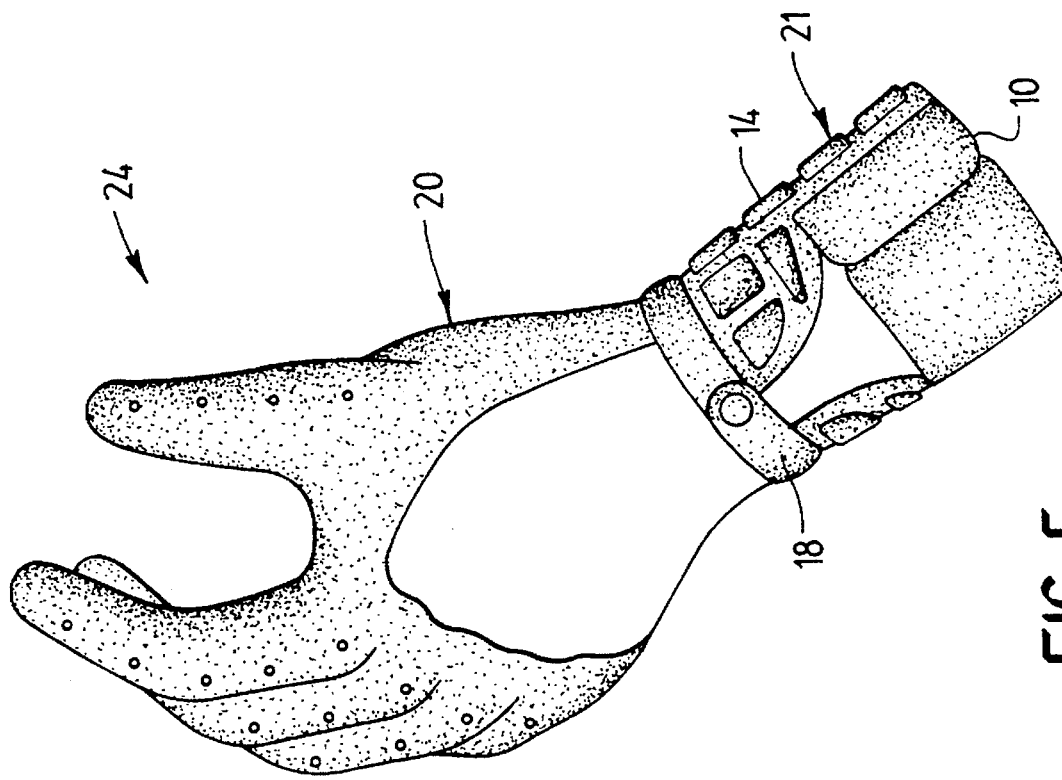
FIG. 5 Is a perspective view of the GLOVE of FIG. 1

The following refers in detail to the drawings. The protective glove generally indicated at 24 and is shown as comprising a plurality of finger stall portions 26 enclosing the fingers. A thumb stall portion 28 enclosing the thumb. A hand portion 24 enclosing the hand. A cuff portion 16, 18 acting as a fastener for the top of the glove. The portions 16,18,24,26 and 28 may be fabricated of any suitable, pliable material or fabric and secured together, as is known in the glove making art.

The palm portion of the glove indicated at 20 contains various pieces of shock-absorbent pliable material 22. These are arranged at the base of the palm, across the base of the fingers and up the finger or fingers 22. The portion that acts as a fastener for the top or hand portion 20 of the GLOVE 24 is attached via 18 a hook and loop type fastener type or other suitable fastener.

Attached thereto is an area 21 of one or more layers of pliable, shock-absorbent material of varying strengths, 12, 14. The area 21 is comprised of a layer of shock-absorbent pliable material 12, with a second stronger layer of shock-absorbent, pliable material. The portion that acts as a fastener for the bottom of the glove 10 is attached via 16 a hook and loop type fastener type or other suitable fastener.

REFERENCE NUMERALS IN DRAWINGS

| 10 wristband fastener | 12 shock-absorbent material |
|---|---|
| 14 shock-absorbent material | 16 fastener |
| 18 glove fastener | 20 hand portion of glove |
| 22 shock-absorbent material | 24 GLOVE in general |
| 26 finger stall portions | 28 thumb stall portion |

OPERATION FIGS. 1-4

The GLOVE 24 is intended to protect the fore mentioned "MEDICALLY SENSITIVE AREAS," of the hand, wrist and lower forearm, and may be readily placed on or removed when needed by merely undoing the hook and loop type fasteners or type fasteners 16 and 18.

The shock-absorbent properties of the GLOVE 24 are positioned adjacent the palm and fingers of the hand 22. The shock-absorbent properties of the GLOVE 24 are also positioned adjacent the wrist and lower forearm 12, 14.

The shock-absorbent material used in the hand portion 22 of the GLOVE 24 to be designed of highly shock-absorbent, pliable material which can absorb severe levels of shock possibility of developing, "WHITE FINGER," while remaining as thin as possible in order to provide for flexibility.

The material used in the portion of the glove that covers the wrist and lower forearm 21 to be designed of a shock-absorbent, flexible, stretchable material making it pliable enough to form-fit around the wrist and front lower forearm. The material 12 to be used as a base upon which a second patterned layer of stronger shock-absorbent material 14 to be placed in such a pattern as to optimize shock-absorbency, and flexibility.

The material to be used to attach the wrist portion 21 of the GLOVE 24 to the forearm, at fastener 16 to be constructed of a liquid absorbent, soft, stretchable, flexible fabric type material often referred to as a wristband or sweatband 10.

SUMMARY, RAMIFICATIONS, AND SCOPE

Accordingly, the reader will see that my GLOVE can be used to protect the fore mentioned, "MEDICALLY SENSITIVE AREAS," of the hand, wrist and lower forearm. When worn properly the GLOVE will afford its wearer said protection in a fashion that allows the wearer to move freely as if no device were being used. The GLOVE offers full range of movement due to the flexible and pliable properties of the shock-absorbent material it employs. The patterned placement of said shock-absorbent material is key to the degree of flexibility as well as protection. Furthermore the GLOVE has the additional advantages in that:

it provides the wearer protection to both the hand, as well as the wrist and lower forearm, with one simple, yet effective product;

it permits the wearer to use a shock-absorbent product in a bodily region that demands extreme flexibility, by way of the implementation of thin extremely shock-absorbent, flexible, pliable material in patterned structure;

it allows the wearer to easily put on and remove the GLOVE via hook and loop type fastener or other type fasteners for convenience purposes;

it permits the wearer to use a protective device that does not impede the ability use the agility required of the hand, wrist and lower forearm, for instance, as in baseball;

Although the description above contains many specifications, these should not be construed as limiting the scope of my GLOVE but as merely providing illustrations of some of the presently preferred embodiments of my GLOVE. For example, the fasteners can be made of materials other than hook and loop type fastener; the configuration of the shock-absorbent material can be re-configured as is needed to allow for the meeting of different demands for protection; extra layers can be added for greater demand of protection; shock-absorbent material can be made of increasingly thinner material as technology permits, etc.

Thus the scope of my GLOVE should be determined by the appended claims and their legal equivalents rather than by the examples given.

Although but a few embodiments of my GLOVE have been shown and described, it will be apparent to those skilled in the art that various changes and modifications may be made therein without departing from the spirit of my GLOVE or from the scope of the appended claims.

We claim:

1. A protective sports glove for use underneath a conventional baseball glove by a baseball player, including:
   (a) an inner glove so dimensioned as to be insertable within a conventional baseball glove when the inner glove is worn on a user's hand, the inner glove having a heal, fingers, knuckles, a palm having a base, and an inner forearm portion;
   (b) first shock absorbing means for protecting a palm of a user, the first shock absorbing means being disposed generally at the base;
   (c) second shock absorbing means for protecting fingers of a user, the second shock absorbing means being disposed generally across the inside of at least one knuckle; and
   (d) a separate shock absorbent wristguard, flexibly coupled to the base along the inner forearm.

2. The protective sports glove of claim 1, wherein the shock absorbent wristguard has alternating areas of relatively thicker material and relatively thinner material.

3. The protective sports glove of claim 1, wherein the shock absorbent wristguard is configured to encase the player's wrist and lower forearm.

* * * * *